Patented July 22, 1941

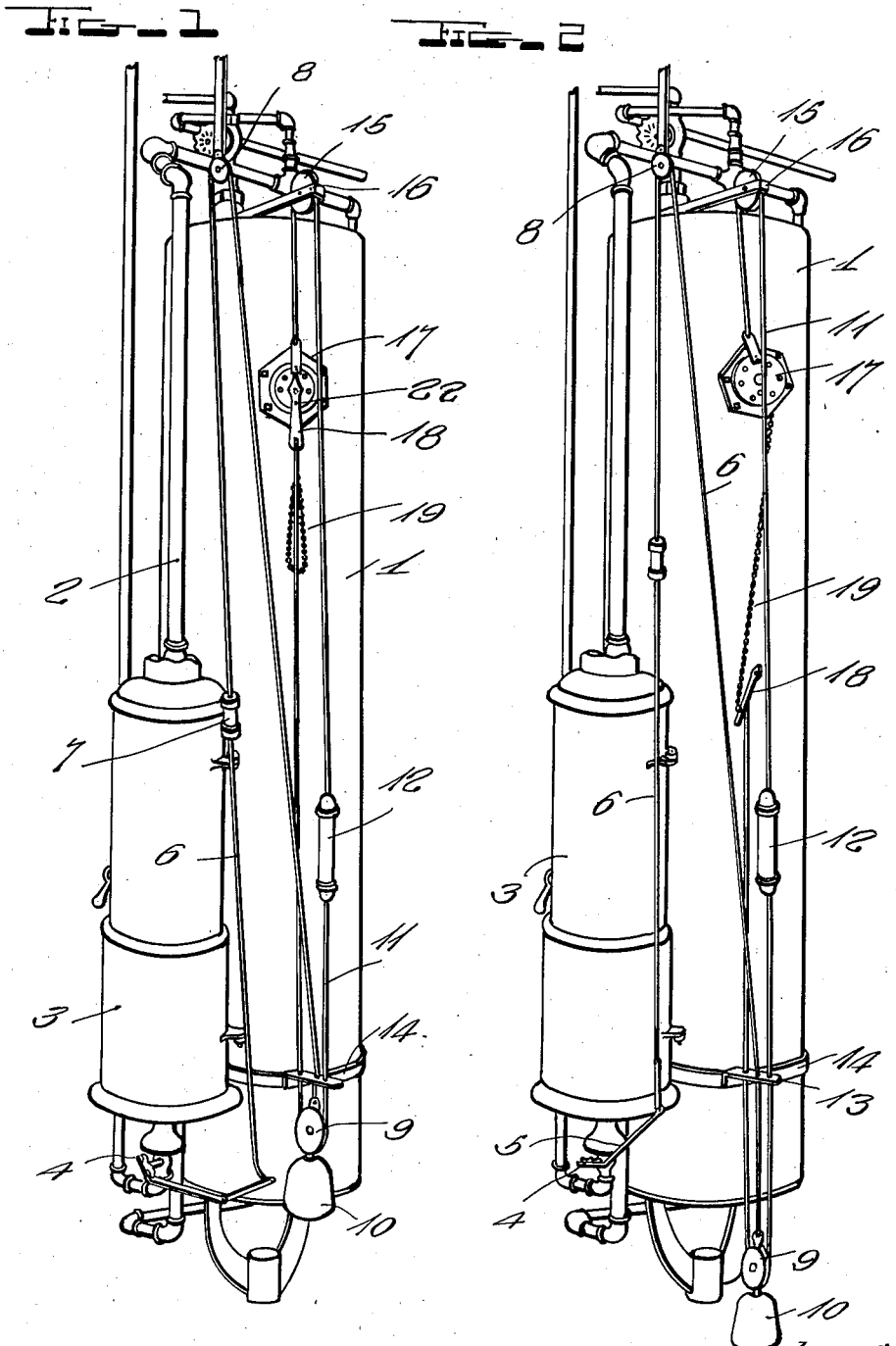

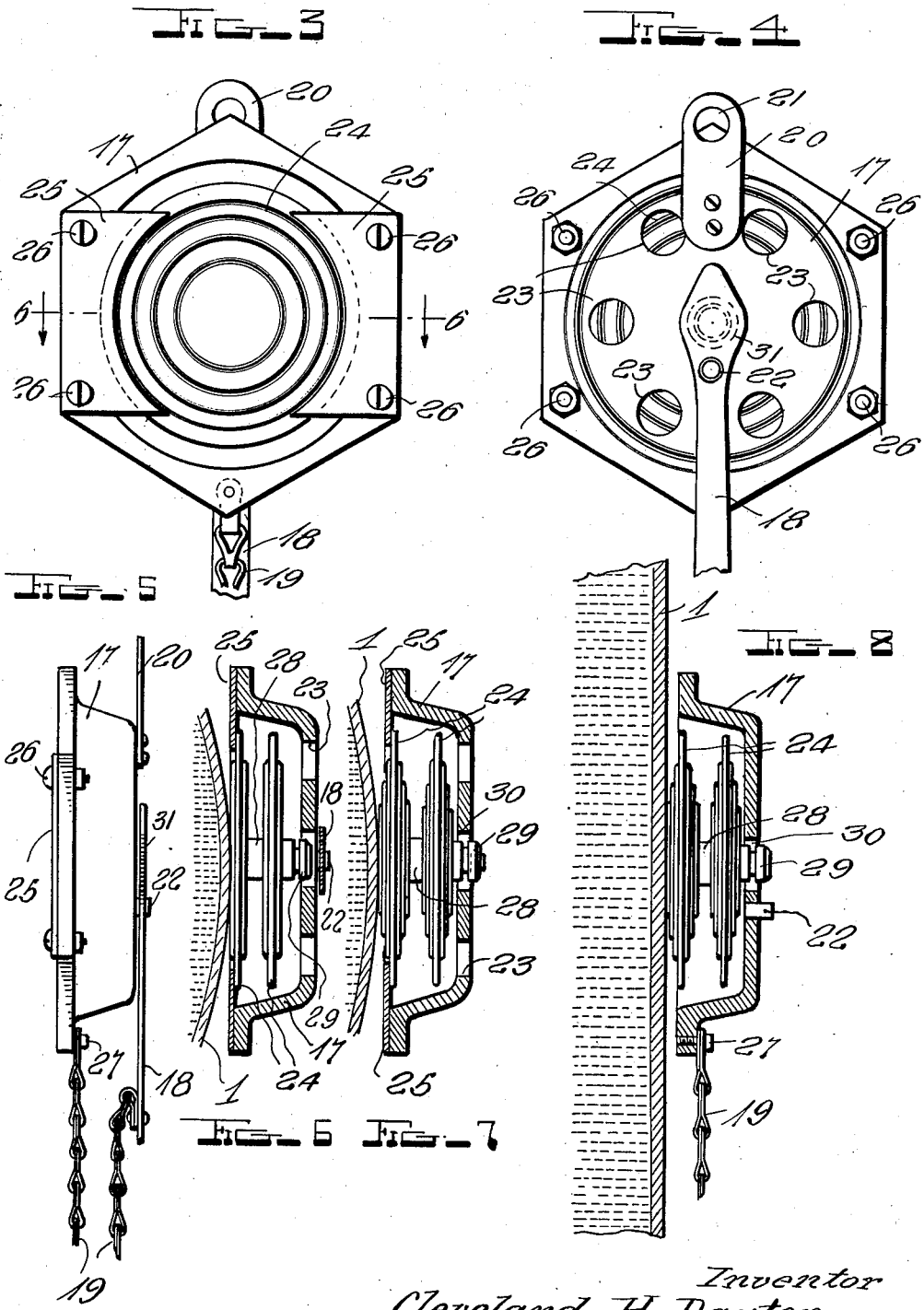

2,249,886

UNITED STATES PATENT OFFICE 2,249,886

THERMAL CONTROL

Cleveland H. Dayton, Champaign, Ill.

Application October 5, 1939, Serial No. 298,146

3 Claims. (Cl. 126—351)

The present invention relates to thermal controls and is more particularly directed to controls for hot water tanks and heaters therefor.

The principal object of the present invention is to provide a control system for shutting off the heating element for a hot water tank when a given amount of the water within said tank has reached a predetermined temperature.

An equally important object of the present invention is to provide a control arrangement of the mechanical type which can be economically produced and which can be readily and simply mounted for operation upon hot water tanks either new or used, in such a manner that it can be as readily dismounted when desired.

A still further object of the present invention is to provide a new and improved form of thermostatic control unit for use in various types of heat control systems.

Further objects of the present invention will be in part obvious and in part pointed out in the following detailed description of the accompanying drawings.

In the drawings:

Fig. 1 is a side perspective view of the thermal control system according to the present invention mounted upon and connected to a hot water heater and its adjoining hot water tank and having the members relatively positioned for operation during the heating period.

Fig. 2 is similar to Fig. 1 but having the elements relatively positioned as they are upon the shutting off of the heater.

Fig. 3 is an enlarged detail rear view of the thermostatic control unit forming a part of the present invention.

Fig. 4 is a front view of the device shown in Fig. 3.

Fig. 5 is a side view of the device shown in Figs. 3 and 4.

Fig. 6 is a top cross sectional detail view of the thermostatic control unit as mounted upon the hot water tank with the elements thereof in their closed or cold position.

Fig. 7 is a view similar to Fig. 6 but showing the members of the control unit when in their extended or heated position, and Fig. 8 is a side cross sectional detail view of the thermostatic control unit in contact with a hot water tank.

Referring now more particularly to the accompanying drawings wherein like and corresponding numerals designate similar elements, numeral 1 refers to the common household hot water tank which is connected by means of a pipe 2 to a gas hot water heating unit 3. The supply of fuel for heating the hot water heating unit 3 is controlled by a valve which is opened and closed by handle 4.

Cable 6, of the present system for controlling hot water unit 3, is connected to one end of an extension rod 5, which rod 5 is connected at its opposite end to handle 4 operating the control valve of unit 3, whereby, handle 4 can be rotated for shutting off the supply of fuel, upon a given amount of water within the tank 1 having reached a desired temperature. Said cable 6 extends upwardly from rod 5 with weight 7 interconnected there and is further positioned around the wheel of a pulley 8 which is supported by a rod detachably connected in any known manner to and extending from the ceiling or piping above the apparatus. The opposite end of cable 6 is connected to the casing of a pulley 9, said casing of pulley 9 having a weight 10 connected thereto and extending therebelow.

A second cable 11 having a weight 12 interpositioned therein extends around the wheel of pulley 9 and also around the wheel of a pulley 15 which is supported by a J-shaped bar 16 detachably connected to the top of hot water tank 1 in any known manner. A guide arm 13 mounted upon water tank 1 by means of a band 14 encircling said tank has three openings formed therethrough, the outer two of which openings each has one of the vertically extending portions of cable 11 slidably mounted therethrough. The middle one of said openings has the portion of cable 6 connected to pulley 9 slidably mounted therethrough. One end of cable 11 is connected to a thermal control unit casing 17, while the opposite end of said cable 11 is connected to a bar 18, which in turn is connected to said thermal control unit casing 17 by a flexible chain 19 and also at times, as shown in Fig. 1, by a peg 22 passing through an opening formed therein.

Said thermal control unit casing 17 has a plate 20 mounted upon the front face thereof and which plate 20 has an opening 21 formed therethrough through which one end of cable 11 can be passed for connection to casing 17. Also mounted upon said front face of the casing 17 is a peg 22 upon which a bar 18 is mounted by inserting said peg 22 within an opening formed in the bar 18. An annular series of openings 23 also is formed through the front face of casing 17 for permitting the ready admittance of air to within the casing.

A pair of expandable wafer-type thermostats 24, each of which consists of a pair of corrugated metallic discs joined together at their outer edge portion, are mounted within the unit casing 17 by a pair of plates 25, each of which plates is connected to the outer edge portion of one of said thermostats 24 and is connected to unit casing 17 by nuts and bolts 26. The thermostats 24 are connected to one another by means of a joining rod 28. The free or inner, that is, relative to casing 17, of said thermostats 24 has a button 29 connected to the front face thereof and said button is positioned for movement through an opening 30 formed in the central portion of the front face of unit casing 17 and, as shown in Fig. 8 of the drawings, said opening 30 is positioned above peg 22 in such a manner as to permit button 29 to contact the broad head portion 31 of bar 18, which, as shown, is shaped to simulate an arrow, when button 29 passes outwardly through opening 30, as shown in Figs. 7 and 8.

A chain 19, which is connected to one end of bar 18, is connected to unit casing 17 by a screw 27, as shown in Fig. 8. This arrangement permits bar 18 to at times be connected to the unit casing by peg 22, as shown in Fig. 5, or when button 29 extends outwardly, forcing bar 18 off of peg 22, then it is connected to casing 17 by the chain 19.

To mount the present thermal control system for operation, pulley 15 is detachably connected to the top of hot water tank 1 or to the pipes connected above said tank in any desirable manner. Band 14 is placed upon the periphery of the tank 1, whereupon, arm 13 will be caused to extend horizontally therefrom. Cable 11 is then passed around both pulleys 15 and 19 and through two of the openings formed through arm 13. Weight 10, which is connected to pulley 9, draws the cable 11 taut after the ends of the cable 11 have been respectively connected to the unit 17 and bar 18 with weight 12 assisting.

One end of cable 6 is connected to an end of extension lever 5 and around pulley 8, which has been connected to a bar or pipe suspended to the ceiling or an overhead pipe. The opposite end of cable 6 is passed through the central opening of arm 13 and connected to pulley 9.

When it is desirable to heat water within the tank 1 bar 18 is mounted upon peg 22 of the thermal control casing 17, thereby drawing up cable 11, which in turn draws up pulley 9 and weight 10. At the same time, cable 6 has the portion thereof connected to pulley 9 raised and the said cable 6 passes over pulley 8 and downwardly for permitting the downward movement of lever 5 thereby admitting gas to be ignited, by the pilot light or otherwise, within the hot water heating unit 3. Weight 7 assures that cable 6 will be pulled taut to prevent any possible tangling thereof.

Cable 11 is at this time substantially an endless cable and casing 17 can be raised or lowered vertically along the tank 1 with weight 12 compensating for the weight of the casing 17. The inner opening of arm 13 is positioned a sufficient distance from the periphery of tank 1 to assure that the portion of cable 11 passing therethrough will pass upwardly along the periphery of tank 1 a given distance therefrom and arm 13 is assisted in this manner by positioning the inner side of pulley 15 a similar distance from the periphery of tank 1. In this manner, unit casing 17, when bar 18 is mounted upon peg 22, has the back thermostat 24 thereof directly in contact with the outer face of tank 1, as shown in Figs. 6, 7 and 8. However, cable 11 is connected to an intermediate portion of bar 18, whereas, chain 19 is connected to an end portion thereof. Therefore, when bar 18 is off of peg 22 and drawn downwardly by its connection to weight 10, then casing 17 is drawn away from the tank 1 to permit the ready cooling thereof.

Therefore, after the water within tank 1 has been heated by the hot water heating unit 3 to within a height equavalent to the point of contact with the periphery of the tank by back thermostat 24, then thermostats 24 will expand and due to their connection to one another by rod 28, they will cause button 29 to move outwardly through opening 30, contacting portion 31 of bar 18 and pushing the bar off of peg 22, whereupon, said bar 18 will be drawn downwardly by its connection to weight 10, thereby extending the length of the cable 11. The downward movement of weight 10 draws pulley 9 and cable 6 therewith, whereupon, cable 6 will draw extension lever 5 upwardly, turning handle 4 and shutting the valve of the gas supply to the hot water heater unit 3. The members at this time will be substantially positioned relative to one another, as shown in Fig. 2 of the drawings. With chain 9 extended and out of line with cable 11, the thermostatic control unit 17 will be drawn away from the outer surface of tank 1, out of contact therewith. Thereupon, air will enter through openings 23 and also through the back of the unit casing 17 for causing the ready cooling of thermostats 24, whereupon, they will quickly return to their normal closed position, as shown in Fig. 6 of the drawings. The unit casing 17 will, at the same time, receive bar 18 upon peg 22, due to the retraction of button 29, whereby, heating unit 3 may again be placed in operation, although the water within the tank 1 has not been cooled and by moving the casing 17 upwardly or downwardly along the periphery of tank 1, more water may be readily heated or part of the previously heated water may have the temperature thereof raised.

The foregoing is merely one way of carrying out the present invention and other elements may be used which are the mechanical equivalent to the elements disclosed herein. Further, extension arm 5 can be used to operate the control means of heating elements using other than gas in the operation thereof. However, any modifications of the present invention which come within the scope of the appended claims are deemed to be a part of the present invention.

I claim:

1. An improvement in thermal controls for hot water heaters and their connected tank comprising a casing adjustably supported longitudinally of said tank, a thermostat carried by said casing at times in contact with said tank, a rod connected to said thermostat and slidably mounted through an opening in said casing, a member detachably supported by said casing and positioned for being detached from said casing by said rod upon the outward movement thereof, a chain connecting one end of said member and said casing, taut means having one end thereof connected to said member and the opposite end to said casing and means operably connected to said taut means for closing the control member of said hot water heater upon the detaching of said member from said casing.

2. An improvement in thermal controls for hot water heaters and their connected tank comprising a cable, means slidably supporting a portion of said cable from the upper end of said tank, an arm for guiding the movement of said cable attached to the lower end portion of said tank, thermostatically controlled means having the ends of said cable connected thereto and being capable of lengthening said cable when the water in said tank reaches a given temperature, means for maintaining said cable taut at all times, a lever connected to the control of said hot water heater and means operably connected to said cable and also connected to said lever for moving the same upon movement of said cable.

3. An improvement in thermal controls for hot water heaters and their connected tank comprising a cable, thermostatically controlled means having the ends of said cable connected thereto and being capable of lengthening said cable when the thermostat is contacted by a heat of a given temperature, a pulley suspended from the top of said water tank and supporting said cable, an arm having openings formed therethrough and having said cable passing through some of said openings, means supporting said arm from the lower portion of said tank, said arm and said pulley supporting said cable relative to the periphery of said tank in such a manner that said thermostat at times contacts said periphery, a second pulley having said cable passing therearound, a weight attached to said second pulley, a second weight interpositioned within said cable and compensating for the weight of said controlled means, a second cable attached to said second pulley, a third pulley supporting a portion of said cable and positioned above said second pulley, and a lever extending from the control of said heater and connected to said second cable.

CLEVELAND H. DAYTON.